United States Patent

[11] 3,539,201

| [72] | Inventor | Theodore Loew<br>Schenectady, New York |
|---|---|---|
| [21] | Appl. No. | 722,474 |
| [22] | Filed | April 18, 1968 |
| [45] | Patented | Nov. 10, 1970 |
| [73] | Assignee | By mesne assignments, to The Standard Products Company, a corporation of Ohio |

[54] AUTOMOTIVE PROTECTIVE DEVICE
5 Claims, 4 Drawing Figs.

[52] U.S. Cl. .................................................. 280/150, 296/28
[51] Int. Cl. ............................................... B60r 21/04
[50] Field of Search ......................................... 280/150; 296/93, 28, 137; 49/490, 491

[56] References Cited
UNITED STATES PATENTS

| 1,329,489 | 2/1920 | Williams .......................... | 280/150 |
| 2,070,760 | 2/1937 | Straith ............................. | 280/150 |
| 2,116,915 | 5/1938 | Tellkamp ....................... | 296/137 |
| 2,624,596 | 1/1953 | Clingman ....................... | 280/150 |
| 2,626,163 | 1/1953 | Scantlebury .................... | 280/150 |
| 2,699,581 | 1/1955 | Schlegel ......................... | 49/491 |
| 3,088,539 | 5/1963 | Mathues et al. ................. | 180/90 |
| 3,356,175 | 12/1967 | Graham .......................... | 188/5X |

*Primary Examiner*—Leo Friaglia
*Assistant Examiner*—Leslie J. Paperner
*Attorney*—Meyer, Tilberry and Body ABSTRACT: The disclosure sets forth the construction and composition of automotive protective devices, particularly padding materials which may be assembled interiorly of an automotive vehicle and act as shields or buffers to prevent violent contact of the body of the driver or passenger of a vehicle with the interior framework of the vehicle. In a preferred form of the present invention a harness is provided which is shaped to conform to the interior structure of the automotive vehicle and this harness is then utilized to carry a protective padding which projects within the interior of the vehicle and prevents violent contact by the body of the driver or passenger with the interior in case of sudden stops or collisions. The padding desirably consists of an elongated material which may be cylindrical in shape having a central foam body encircled by a plastic covering which may carry a decorative design. The mounting member desirably consists of a joiner or edge gripping which may be mounted on interior ledges of the automotive vehicle, to which the plastic cylindrical padding or expanded material may be readily attached. This attachment may be formed by means of heat and pressure or by an adhesive, but is desirably prepared by insertion of an electrically heated knife between the two elements to be adhered together, followed by withdrawal of the knife and attachment of the padding to the edge-binding or framing members.

Patented Nov. 10, 1970

INVENTOR.
THEODORE LOEW

BY *Inny Reece*

ATTORNEY

Patented Nov. 10, 1970        3,539,201

INVENTOR.
THEODORE LOEW
BY
ATTORNEY

AUTOMOTIVE PROTECTIVE DEVICE

SUMMARY OF THE INVENTION

The present invention relates to a protective system readily applicable to the interior of an automotive vehicle. Although particularly directed to the interior of passenger automobiles, it also has a broad application to the cabs of industrial vehicles, such as trucks, and even to the interior of homes and business places or in connection with appliances, articles of furniture and the like.

It is among the objects of the present invention to provide a simplified system for protection against collisions and forcible contacts particularly adapted for the interior of automotive vehicles, which will be readily applied, simple in construction and durable after application. Another object is to provide a simplified, readily applicable structure which may be applied to the interior of automotive vehicles and which will protect the driver and passenger against injury upon collision or upon sudden stoppages.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one embodiment of the present invention as applied to automotive vehicles, the protective padding or stripping is applied by means of a harness, which is desirably so constructed as to be readily attached to the frame or other interior structure of the automotive body or cab. The structural element desirably includes an edge-gripping or binding member of U-cross section, which is coated or covered with a plastic material, such as for example a polyvinyl material, or even a synthetic or natural rubber and which is designed to be fitted onto and permanently grip an interior structure of the automotive vehicle.

The actual padding material desirably consists of elongated strips, desirably of cylindrical or semicylindrical cross section, which are wrapped in reinforcing materials and in plastic covers and which are adhesively mounted on the inside faces of the gripping or binding U-cross section structures. A harness or attachment may thus be conveniently formed which will be readily applicable to the interior of an automotive vehicle and will protect it. Desirably, the padding or protective material is attached by means of heat or adhesive or a combination of the two. Desirably, the adjacent faces of the padding and edge binding may be contacted together by means of a hot knife or adhesive material and by slight pressure.

BRIEF DESCRIPTION OF DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Referring to FIGS. 1 and 2, there is shown an edge binding or strip structure A and a cushioning or padding strip B. The holder C is indicated in FIG. 1, together with the hot sealing knife D. The presser member E is indicated above the edge binding A. The edge-binding holder F is shown in position in FIG. 1 and withdrawn from position in FIG. 2. Referring particularly to FIG. 1, the holder or positioning member C may consist of a pad 10 having a groove 11 to receive the material B.

Figure 2:
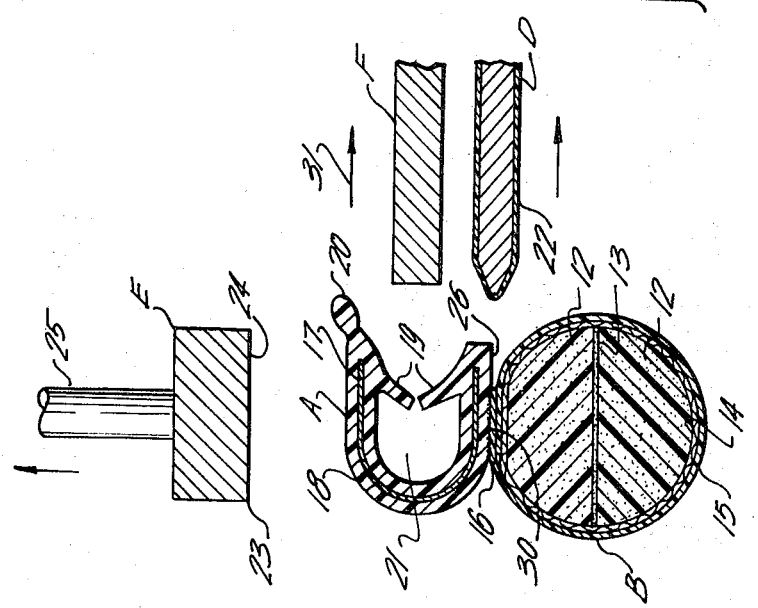
FIG. 2 is a fragmentary transverse sectional view showing the structure after the seal has been completed.

The padding material, as shown best in FIG. 2, is formed of two semicylindrical foamed or expanded vinyl resin materials which may be of semicylindrical cross section and sealed together by adhesive or heat, as indicated at 13, along a diameter or cross section. This foamed material is wrapped in the scrim or fibrous reinforcement 14, which desirably consists of a crisscross nonwoven fibrous material and which may be made from fiberglass. It is exteriorly wrapped in a layer of extruded or otherwise prepared plastic film, such as a polyvinyl chloride plastic material 15, which is overlapped at 16.

Figure 1:
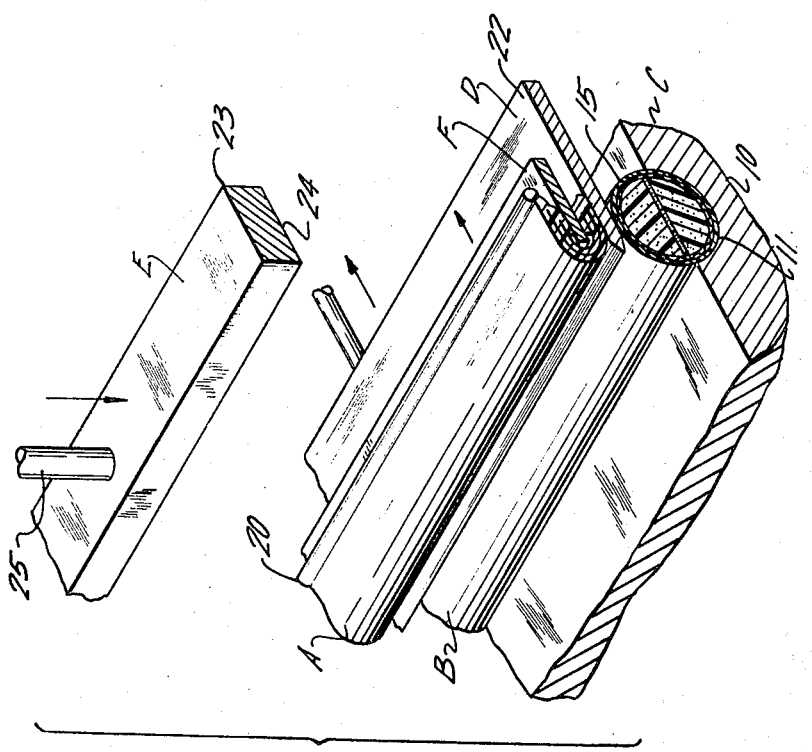
FIG. 1 is a fragmentary top perspective view showing the manner of sealing the protective padding to the edge binding.

The edge binding consists of a U-shaped or channel-shaped reinforcing metallic core member 17 embedded in a plastic sheath 18, having inwardly obliquely turned gripping fingers 19 and a removable tongue 20. In attachment of the edge binding A to the porous strip B, the holder member F is first inserted in the cavity or recess 21 between the gripping lips 19, as shown in FIG. 1. Then the hot knife D, which is covered by a protective plastic covering 22, such as Teflon or polyfluorinated hydrocarbon, is inserted between the edge binding A and the padding strip B held in the recess 11.

The presser member E, having the platen portion 23 with the contact face 24 and the rod 25, is pressed downwardly to lightly press the edge-binding A against the knife D on its inside face 26, and also the overlap portion 16 of the padding material B against the other side of the knife, as indicated best at FIG. 1. When there is sufficient softening of the overlap portion 16 and the face 26, the knife D is withdrawn with the edge binding A being held in position by the insert F and the padding B being held in position by the recess 11.

Then the platen 23 is pressed down still further to a junction and sealing as indicated at 30 of the strip structure or edge binding A and the padding B. Then finally the holder element F is withdrawn, as indicated by the arrow 31, and the combined structure A and B are ready to be applied to a suitable mounting structure, such as the interior of an automotive vehicle.

Figure 3:
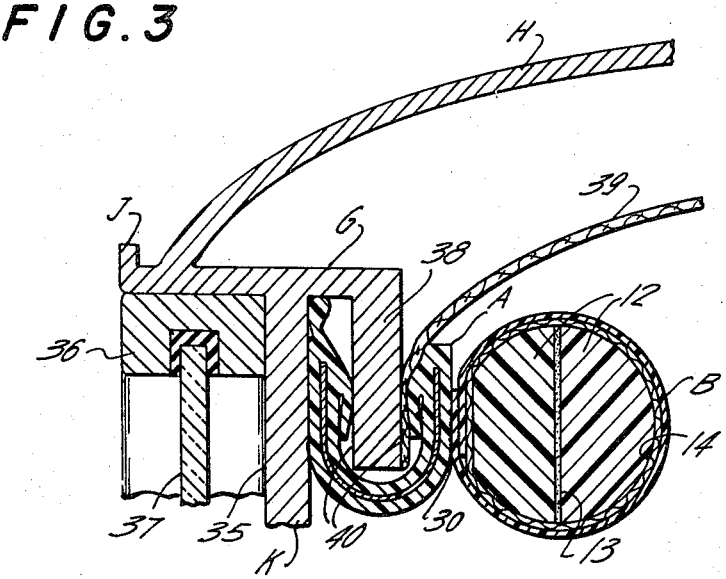
FIG. 3 is a transverse sectional view similar to FIG. 2 showing the structure attached to the interior of an automotive vehicle.

As diagrammatically illustrated in FIG. 3, the automotive frame F may constitute the structure around a door or window and it is indicated as connected to the top of the vehicle H. A rain ledge J and the frame K are shown as being provided with the window recess 35 having the window frame 36 and the sliding glass 37. The structure K may be provided with a depending inside ledge member 38 which will receive or be gripped by the U-shaped structure A, together with the interior fabric cover 39. This edge binding A will grip the sidewalls 40 of the depending member 38 and hold the padding B in position by the sealed connection 30.

Figure 4:
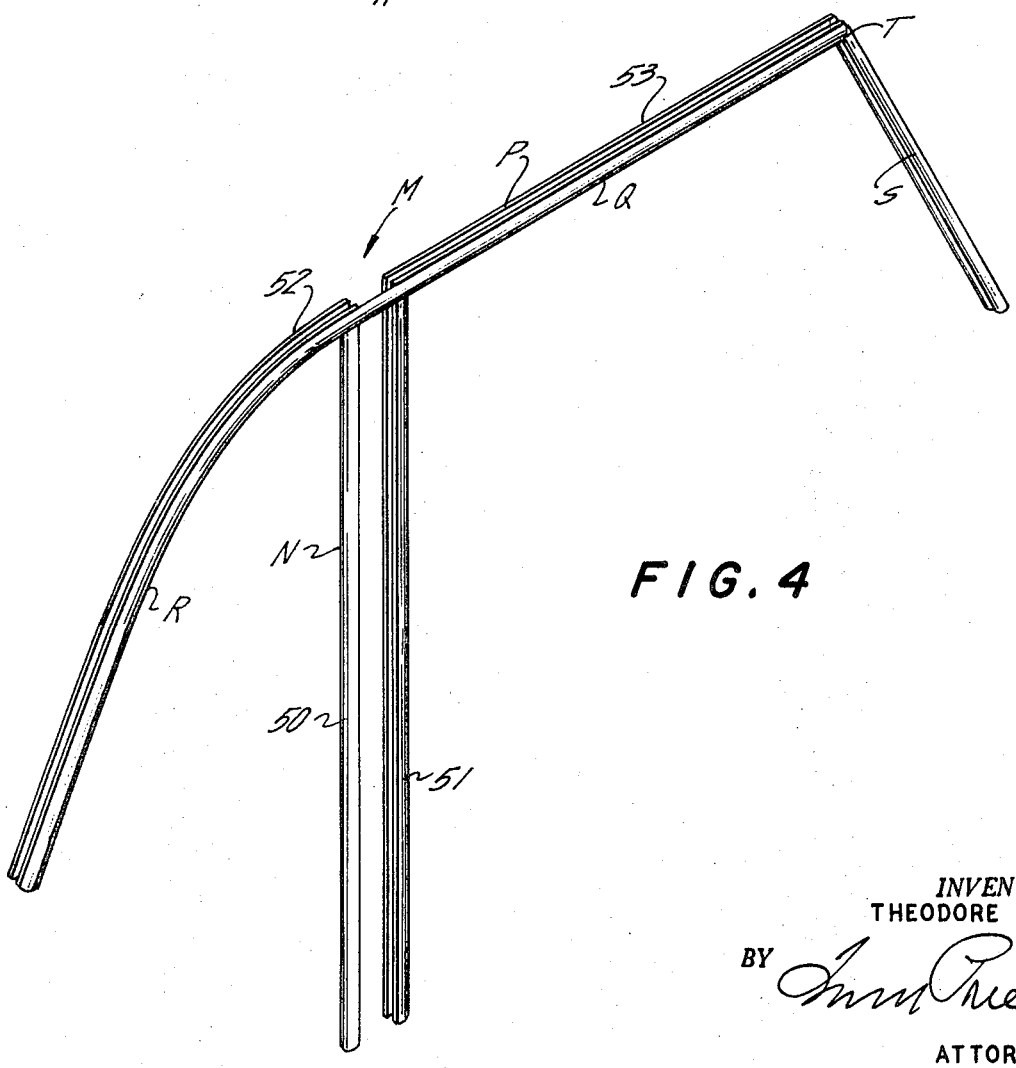
FIG. 4 is a diagrammatic perspective view showing the harness which may be set up to be attached to the interior of the automotive vehicle.

Referring to FIG. 4, there is shown a frame or harness M that may be readily prepared for quick mounting on the interior of an automotive vehicle. This harness has the edge-binding section N, for example, to be fitted around the rear door of the vehicle and the forward section P to be fitted around the forward door, both having vertical members 50 and 51 and top members 52 and 53. The padding extends across the top of the structure, as indicated at Q, then downwardly at R toward the rear, and also downwardly at S toward the front with an oblique seal being formed at T.

By providing structures such as indicated at M, it is possible to mount the binding as well as the padding structure directly onto an automotive vehicle structure with a minimum of labor and a maximum of convenience.

As many changes could be made in the above automotive protection device, and many widely different embodiments of this invention could be made without departure from the scope of the claims, it is intended that all matter contained in the above description shall be interpreted as illustrative and not in a limiting sense.

I claim:

1. A protective cushioning system for the interior of automotive vehicles or the like to prevent injury upon collision and violent contact, said system comprising a harness to be fitted upon the interior of the frame of an automotive vehicle, said harness comprising an engaging strip structure engaging the frame of the automotive vehicle and an elongated inwardly projecting protective cushioning attached to the engaging strip structure on the inside face thereof and extending along the inside face of the frame of the vehicle to protect passengers and drivers against contact with the frame, said engaging strip structure having grasping means grasping the frame and said cushioning means being adhesively connected to the engaging structure, said cushioning means including a covering of thermoplastic material.

2. The system of claim 1, wherein said engaging strip structure comprises a U-shaped metallic core member embedded in a plastic cover, said cover including gripping fingers formed thereon adapted to grasp the frame of the vehicle.

3. The system of claim 1, wherein said protective cushioning comprises foam material wrapped in a plastic film, said film being adhesively secured to said engaging strip structure.

4. The system of claim 1, wherein said cushioning comprises two semicylindrical strips of vinyl foam cemented together at their flat faces, said covering including a wrapping of scrim material around the foam and a wrapping of plastic material around the scrim.

5. The system of claim 1 wherein the harness includes an engaging strip structure for the frame defining each of the front and rear door openings of an automotive vehicle and the protective cushioning is secured to and interconnects the tops of the engaging strip structures for each of said doors.